United States Patent [19]

Krygowski et al.

[11] Patent Number: 5,630,045
[45] Date of Patent: May 13, 1997

[54] DEVICE AND METHOD FOR FAULT TOLERANT DUAL FETCH AND STORE

[75] Inventors: Matthew A. Krygowski, Hopewell Junction; Arthur J. Sutton, Cold Spring, both of N.Y.

[73] Assignee: International Business Machines Corporation, Armonk, N.Y.

[21] Appl. No.: 349,768

[22] Filed: Dec. 6, 1994

[51] Int. Cl.[6] .................................................. G06F 11/34
[52] U.S. Cl. ................... 395/182.08; 395/726; 395/728; 364/246.8
[58] Field of Search .......... 395/182.08, 182.09, 395/182.1, 182.11, 180, 726, 728; 364/229, 229.4, 230, 230.5, 238.4, 246.6, 246.8, 268, 268.3, 269.2, 944.2, 944.6, 968, 969.2, 970

[56] References Cited

U.S. PATENT DOCUMENTS

| | | | |
|---|---|---|---|
| 4,207,609 | 6/1980 | Luiz et al. | 364/200 |
| 4,733,352 | 3/1988 | Nakamura et al. | 364/200 |
| 5,023,779 | 6/1991 | Federico et al. | 364/200 |
| 5,144,692 | 9/1992 | Baker et al. | 364/232.3 |
| 5,161,156 | 11/1992 | Baum et al. | 371/37.1 |
| 5,201,040 | 4/1993 | Wada et al. | 395/400 |
| 5,271,023 | 12/1993 | Norman | 371/68.3 |
| 5,291,581 | 3/1994 | Cutler et al. | 395/425 |
| 5,293,602 | 3/1994 | Fukagawa et al. | 395/425 |
| 5,313,628 | 5/1994 | Mendelsohn et al. | 395/575 |
| 5,388,242 | 2/1995 | Jewett | 395/425 |
| 5,398,331 | 3/1995 | Huang et al. | 395/575 |
| 5,455,940 | 10/1995 | Daniel et al. | 395/182.02 |
| 5,491,787 | 2/1996 | Hashemi | 395/182.09 |

Primary Examiner—Robert W. Beausoliel, Jr.
Assistant Examiner—Trinh Tu
Attorney, Agent, or Firm—Lily Neff

[57] ABSTRACT

Fault tolerant systems allow continuous service during the occurrence of a hardware failure. To provide such service, usually dual copies of data are stored in case of a hardware failure affecting the original copy. This dual copying causes the system an overall performance degradation. The present invention discloses a device and method for performing parallel fetch and store commands, allowing multiple copying of data into storage without affecting the performance of the system. In one embodiment of the invention, a method is described utilizing a multiprocessor system having two system controllers (SCs) and a plurality of requestors defined as a plurality of central processors (CPs) and input-output (I/O) processors. Asymmetric structure is accomodated. Single and dual requests can be intermixed. Each requestor has access to both system controllers, allowing either controller to process a requestor issued command. An interlocking data protection mechanism is also provided to protect data integrity by allowing requestors data access to a given unit of data only on a one at a time basis. Data exclusivity ownership access to a given unit of data is being provided by and removed by the system controllers. When a command is issued by one of the requestors, the system controllers process the command and provide the requestor with a response upon processing completion. In the mean time, the requestor can perform any required data updates. This concurrent processing improves the performance of the system but also protects its integrity.

7 Claims, 8 Drawing Sheets

FIG. 1

MULTIPROCESSOR SYSTEM 100

ENTRY CONTENT

- PHYSICAL ADDRESS-710
- INSTALLED/UNINSTALLED-720
- SYSTEM AREA PROTECTION-740
- MAIN STORAGE/EXPANDED STG. IDENTIFIER
- DUAL STORAGE IDENTIFIER

DEVICE AND METHOD FOR FAULT TOLERANT DUAL FETCH AND STORE

FIELD OF THE INVENTION

This invention relates to a method for allowing parallel stores in a fault tolerant multiprocessing system, without a need for software maintenance of redundant copies of all data in storage.

BACKGROUND OF THE INVENTION

A fault tolerant system is designed to allow continuous service by the system during the occurrence of a hardware failure. In such cases, to restore data and maintain its integrity, a master copy of the data generated by the computer is kept in storage somewhere in the main memory at all time. Therefore everytime data is compiled, it is usually preserved in some hard copy device such as a hard disc or a tape for future use. It is also common practice to keep dual copies of data, in case of hardware failures affecting the original copy. To keep the necessary storage at a minimum data is packed and the procedure of backing up data is time consuming, and causes overall performance degradation of the system. Storage is a critical element of a fault tolerant system. Tasks are terminated and have to be restarted when critical storage data is damaged, affecting the overall turn-around time for the completion of the program. It has been an on-going challenge to provide a data storing method that can selectively copy multiple copies of data into storage without affecting the performance of the system as a whole and to address the problem of data restoration after a hardware failure.

OTHER PATENTS RELATING TO THE FIELD OF INVENTION

U.S. Pat. No. 4,356,550 teaches a dual multiprocessor system with a plurality of power supplies and a method of recovery and an error detection and correction system in the memory of each processor. Although U.S. Pat. No. 4,356,550 uses a separate memory for each CP, but there is no teachings of a correction mechanism used for recovery of multiple memory bit errors. Similarly there is no teachings of a redundant storage which corrects as in the present invention.

U.S. Pat. No. 4,819,154 apparently discloses a multiprocessing system with a fault-tolerant computing and stored information sequentially written in two separate memory units. There are no teachings or suggestions of a method that allows parallel stores and fetches by using a multiprocessor system.

U.S. Pat. No. 4,933,823 apparently teaches a dual system of microprocessors with an active and a backup state, providing simultaneous processing of data or stores by continuously comparing signals. There are no teachings or suggestions of a method using asynchronous configuration of hardware and assignment of storage addresses in both system controllers, allowing selective assignment to either the primary or a secondary system controllers or choice or selective duplication.

U.S. Pat. No. 4,654,819 discloses a multiprocessing system and fault-tolerant computing and memory back-up system which allows back-up status information to be written from storage area for updating and backup status. There are no teachings or suggestions of a processor allowing parallel fetch and stores.

U.S. Pat. No. 4,933,835 appears to teach a dual microprocessor system capable of independently storing digital information on separate or parallel buses with a first and a second data processing elements. There are no teachings or suggestion of non-exclusive lines which are only to be stored in one SC concurrently with dual store to both SCs.

U.S. Pat. No. 4,317,169 apparently teaches a method for performing memory refresh operation where the memory refresh operation signal can be given to the memory unit in parallel with or without detracting from CPU operation. There are no teachings or suggestion of a fault tolerant system capable of handling parallel fetch and store operations.

U.S. Pat. No. 5,101,492 seems to disclose a method and apparatus for maintaining data redundancy and restoring data to a failed disk within a disk array in a manner transparent to the host system and user. However, this invention uses software to rewrite data to accomplish write restores to disk. There are no teachings or suggestions of a device and method for performing parallel stores.

U.S. Pat. No. 4,996,687 teaches a method and apparatus allowing fault recovery in a system whereby the system upset can be induced by external transient noise conditions. There is no teachings or suggestion or a method involving hard error recovery as discussed in the present invention.

U.S. Pat. 4,387,423 discloses a multiprocessing system with a rechargeable memory which is used for storage of software instructions and a memory refresh operation. There are no teachings or suggestions of a multiprocessing system capable of handling simultaneous stores and fetches.

SUMMARY OF THE INVENTION

Accordingly, an object of the present invention is to provide a device and method for allowing parallel stores in a fault tolerant multiprocessing system.

Another object of the present invention is to improve the performance and integrity of a fault tolerant system by providing a device and method that allows parallel stores without a need for software program maintenance of redundant copies of all data in storage.

Yet another object of the present invention is to provide a data storing method that can selectively copy multiple copies of data into storage without affecting the performance of the system as a whole.

Still another object of the present invention is to allow continuous service by the system during the occurrence of a hardware failure while improving performance and integrity of the system.

To achieve the above-mentioned objects, in one embodiment of the invention a method for the same is described, utilizing a multiprocessor system having at least two memory controllers. The invention can also be used in an environment where there is a plurality of central processors (CPs) which can be partitioned to provide a plurality of system sides for the multiprocessor system. This multiprocessor system also includes a plurality of input-output (I/O) processors; each of these CP and I/O processors being further defined as a requestor.

The present invention allows information to be accessed and stored by either memory controller in different areas of the memory. During the initialization process, each memory controller is designated a specific area in the memory for its usage. The physical address of the memory location is stored in separate logic arrays either indicating the actual physical address or a virtual address that can be translated at any time to reflect the physical address when the specified area designated to each memory controller needs to be accessed.

The present invention provides access to either memory controller preventing continuous engagement of one of the memory controllers at all times.

Each requestor selects one of the memory controllers for each data space as a primary memory controller and the remaining memory controller as a secondary memory controller. The selection of these memory controllers as primary and secondary is stored by a unit of data in the logic array associated with each of these requestors. In addition, the logic array defines single or dual copy of data which may be selectively assigned to either primary or secondary memory controllers.

To protect data integrity, the present invention uses an interlocking data protection mechanism providing data access to only one of the requestors at any one time. The memory controllers determining an exclusivity ownership access status for these requestors and also removing this exclusivity ownership access when the requestor is no longer in need of accessing the data.

When a fetch or store command is issued by any of the requestors, each system controllers processes the command and provides the requestor with a response upon processing completion. The requestor, while waiting for this response, can perform any required data updating. A response must be received from both memory controllers. The primary memory controller in addition to the above-mentioned response also provides the requestor with data in pursuant to the earlier issued store or fetch command.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 5 compares the prior art approach to an I/O store instruction (5A) versus the steps occurring pursuant to an I/O store instruction in one embodiment of the present invention (5B);

DETAILED DESCRIPTION OF THE INVENTION

Figure 1:
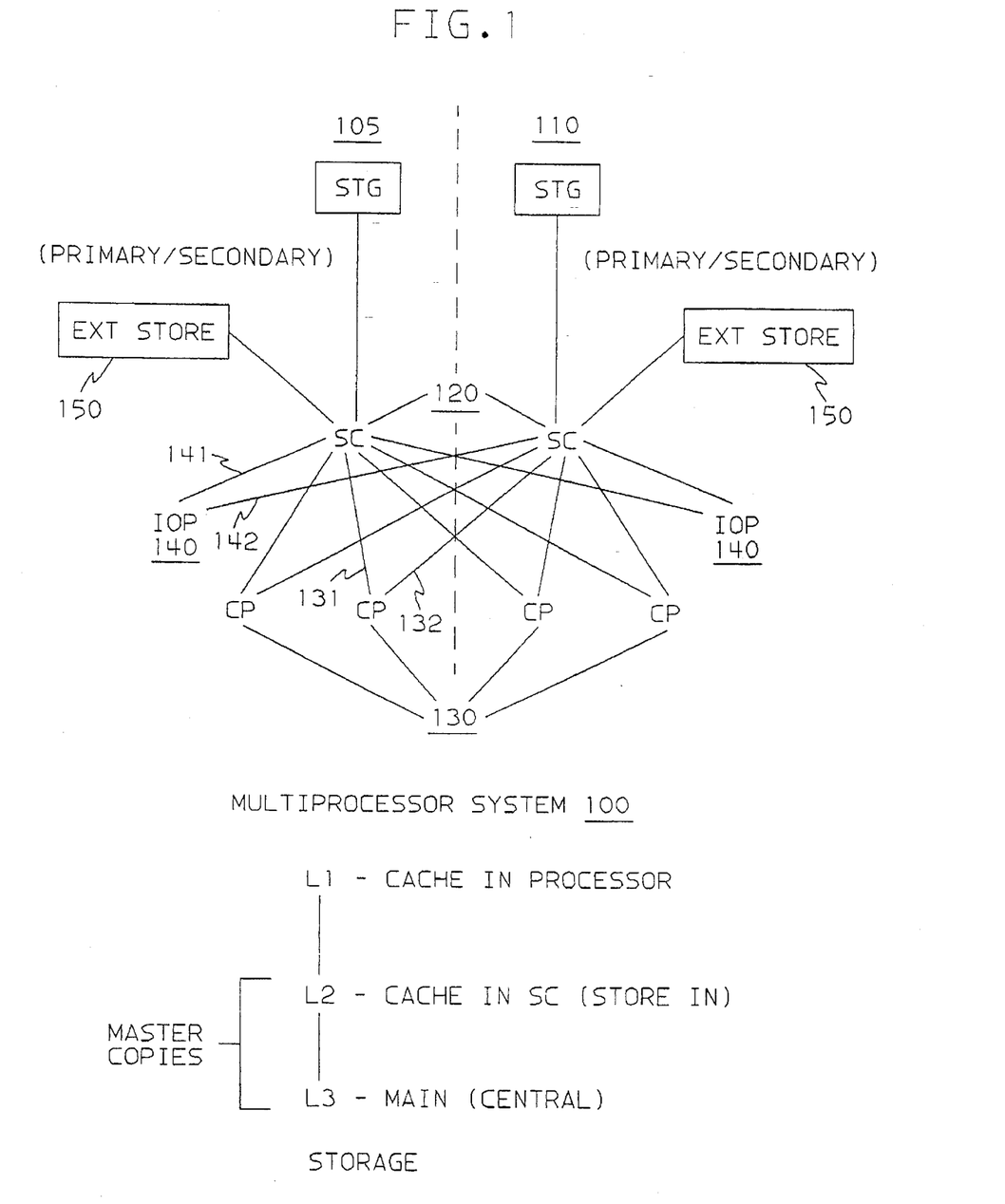
FIG. 1 is a schematic diagram showing one embodiment of the present invention where a multiprocessor system configured into two sides, each side having a memory or system controller (SC), multiple central processor (CPs), an I/O processors and an extended storage.

This invention is capable of providing a means to concurrently store multiple copies of data to storage reducing the performance overhead of serial waiting for multiple responses to the stores. FIG. 1 shows one embodiment of the present invention where a multiprocessor system 100, configured into multiple symmetric or asymmetric sides 105 and 110, with each side having a memory or system controller 120 and multiple processors 130 and or I/O processors 140 on each of the sides, as shown in FIG. 1. The sides of a multiprocessor can be reconfigured into independent systems or configured back to a multiprocessor system. FIG. 1 also shows each side having an extended storage 150.

The multiple processors 130 and I/O processors known as requestors 140, a data protection design is provided so that only one processor is changing a given line of data at one time in order that the latest or master copy of the data is used. An exclusivity bit is assigned to a line of data, when fetched, by a requestor. A requestor sets an exclusive fetch when data is to be changed. Each memory controller maintains a copy of the exclusivity bits. Before assigning a line of data to a processor, the memory controller verifies that no other requestor has assignment to that line of data. The memory controller removes previous ownership (a line of data, which has been stored exclusively) from all copies of the data when the new exclusive fetch request is honored. Likewise, when a requestor stores the data in a multiple copy storage system, both or all copies must be stored, before any other requestor can have access to any of the copies. If it is not a dual copy request only one store takes place.

Generally the method used in prior art has been for the requestor to wait for a successful response for all the stores before proceeding to the next instruction, passing a synchronization point). In the prior art, a processor will fetch exclusive data from one memory controller, wait for data and response. Data is updated by the processor and then stored to the one system controller, containing one copy of the data, wait for response and then store the same data to another memory controller, containing another copy of the same data, wait for response. However, in this store a fetch is required to access the data to be changed and then store the data. Exclusivity being allowed to be removed after the last memory controller response. This response mechanism does not require system controllers to process requests in lock step, allowing asymmetric systems to exist.

Figure 2:
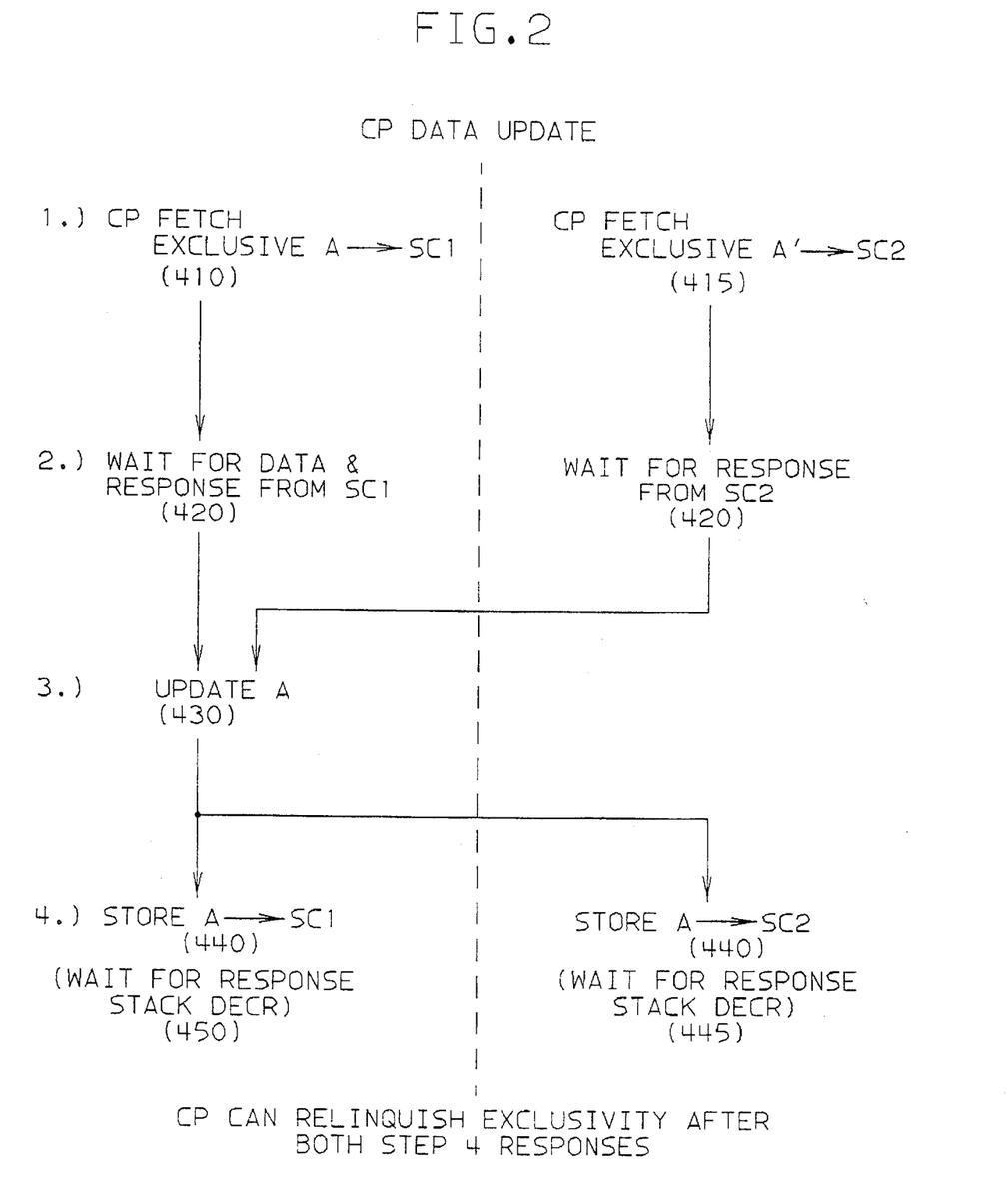
FIG. 2 shows the steps of a CP update, in one embodiment of the present invention.

In the present invention as shown in FIG. 2, the requestor issues an exclusive fetch 410 to the primary memory controller and simultaneously to the secondary memory controller 415 and waits for responses from both memory controllers 420. The secondary memory controller noted by a modifier in the fetch command. The primary memory controller executes the cross interrogation with all other requestors to see that data is not being held exclusive. If held exclusive by another CP requestor, exclusivity is removed by signalling the original owner. The original owner signals release of the memory controller when related. Changed data arrives at SC store stacks. When the memory controller removes the data from the store stack to storage old ownership is removed. If data was not held exclusively previously, then the memory controller directory 430 is updated to reflect ownership removal. The secondary memory controller waits for a synchronization command from the primary memory controller. The primary memory controller then synchronizes with the secondary memory controller by sending status of the requestor to the secondary memory controller when outstanding exclusivity is removed. Both memory controllers update their directories to reflect new ownership status. Storage is accessed by both memory controllers, data is delivered to the memory controller caches (if not already there). Data and response from primary memory controller is sent to the requestor, response only, no data, is sent from the secondary memory controller. The requestor receives both responses. The fetch access of the secondary memory controller overlaps any primary SC access and possibly the requestor update of data.

The requestor, after data update, stores the data simultaneously to both the primary 440 and secondary memory controllers 445, waits for response from both memory controllers 450 and 455 respectively. At this point the requester can respond to the primary that memory controller and that exclusivity can be removed for a new update from another requestor. In this manner update order is maintained. Requestor coordinates store responses as a means of maintaining ownership and data integrity.

Figure 3:
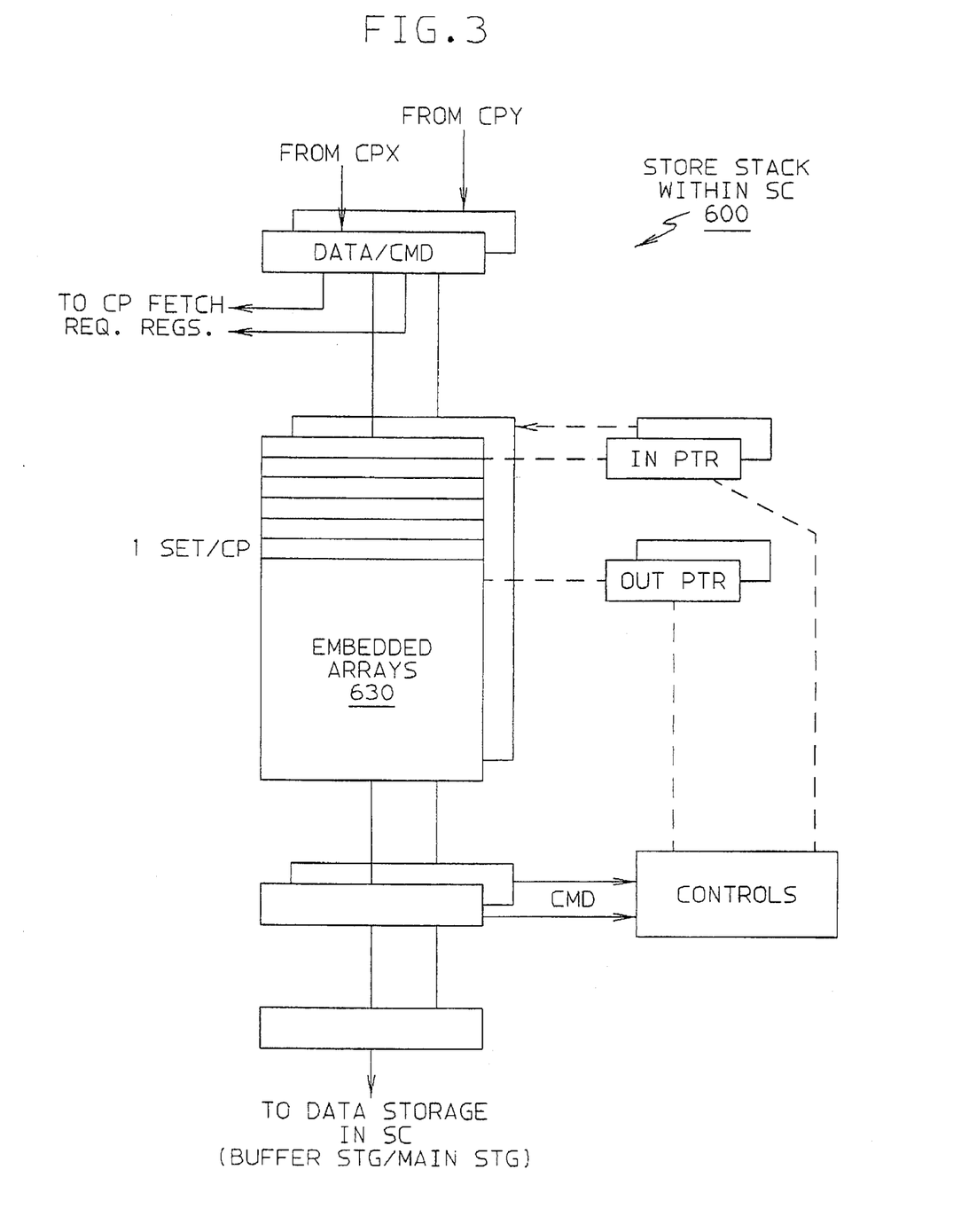
FIG. 3 is a schematic diagram of a store stack in a system controller.

FIG. 3 shows the data stored in the storage of each of the system controllers 600. Requestors, processors for instance, have ports 131, 132, 141, 142 to each system controller respectively and requestors in a dual storage system fetch/store data to both system controllers. The requestors configuration array identifies which system controller is a primary memory controller for this data and which is a secondary. Designation of primary and secondary is based upon a unit of data, such as a megabyte range of data in the configuration array. (Primary and secondary may be on either SC side.) This allows either memory controller to be accessed for a fetch or store request without loading one side all the time.

Figure 4:
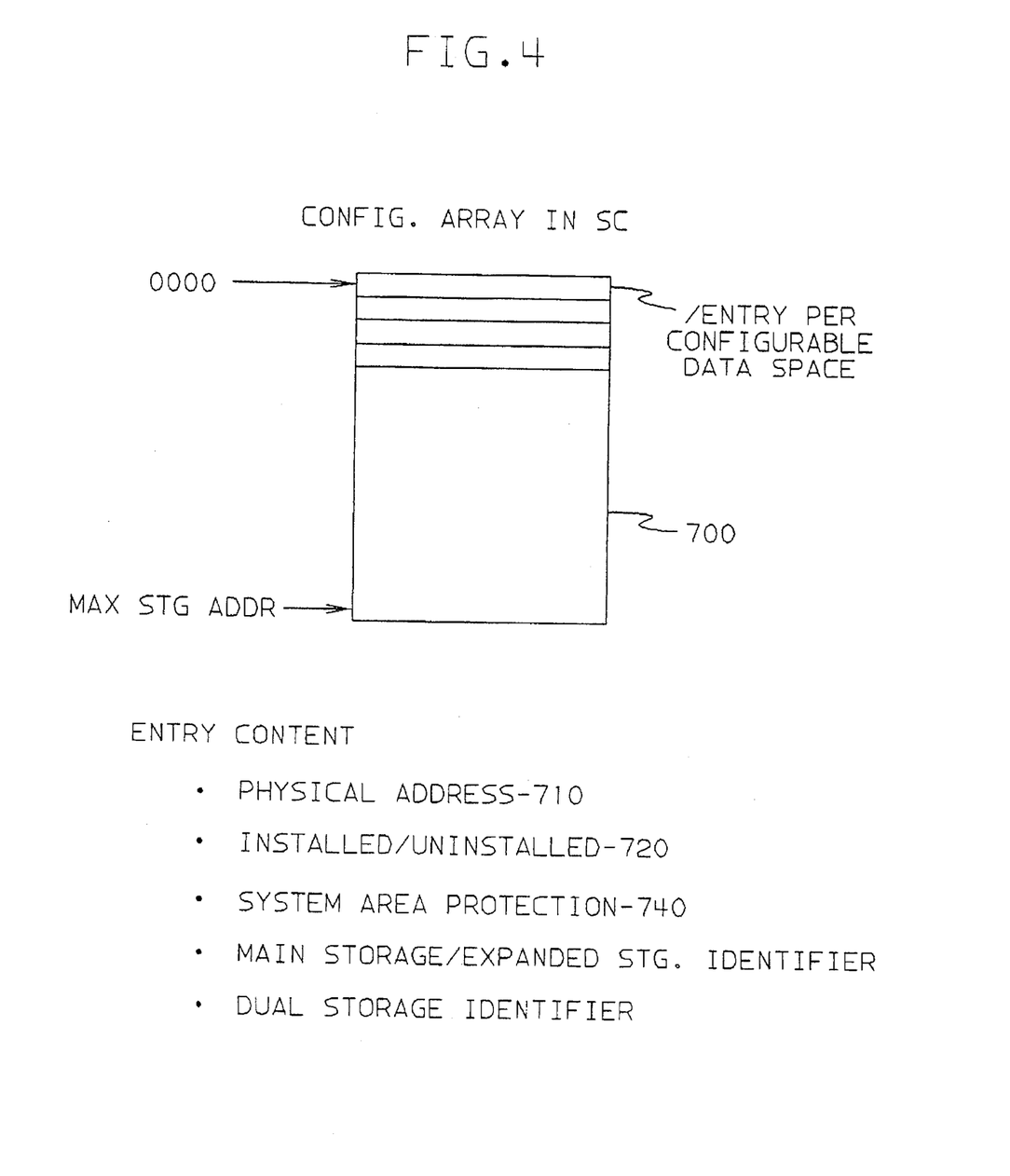
FIG. 4 shows the configuration array within each memory controller, identifying each memory controller as a primary or secondary memory controller.

The configuration array of the system controller 120, is shown in greater detail in FIG. 4. Each system controller's embedded configuration array 700 can hold information about the physical address 710, installed or uninstalled elements 720, and about the system area 740 of the storage elements attached.

Figure 5A:
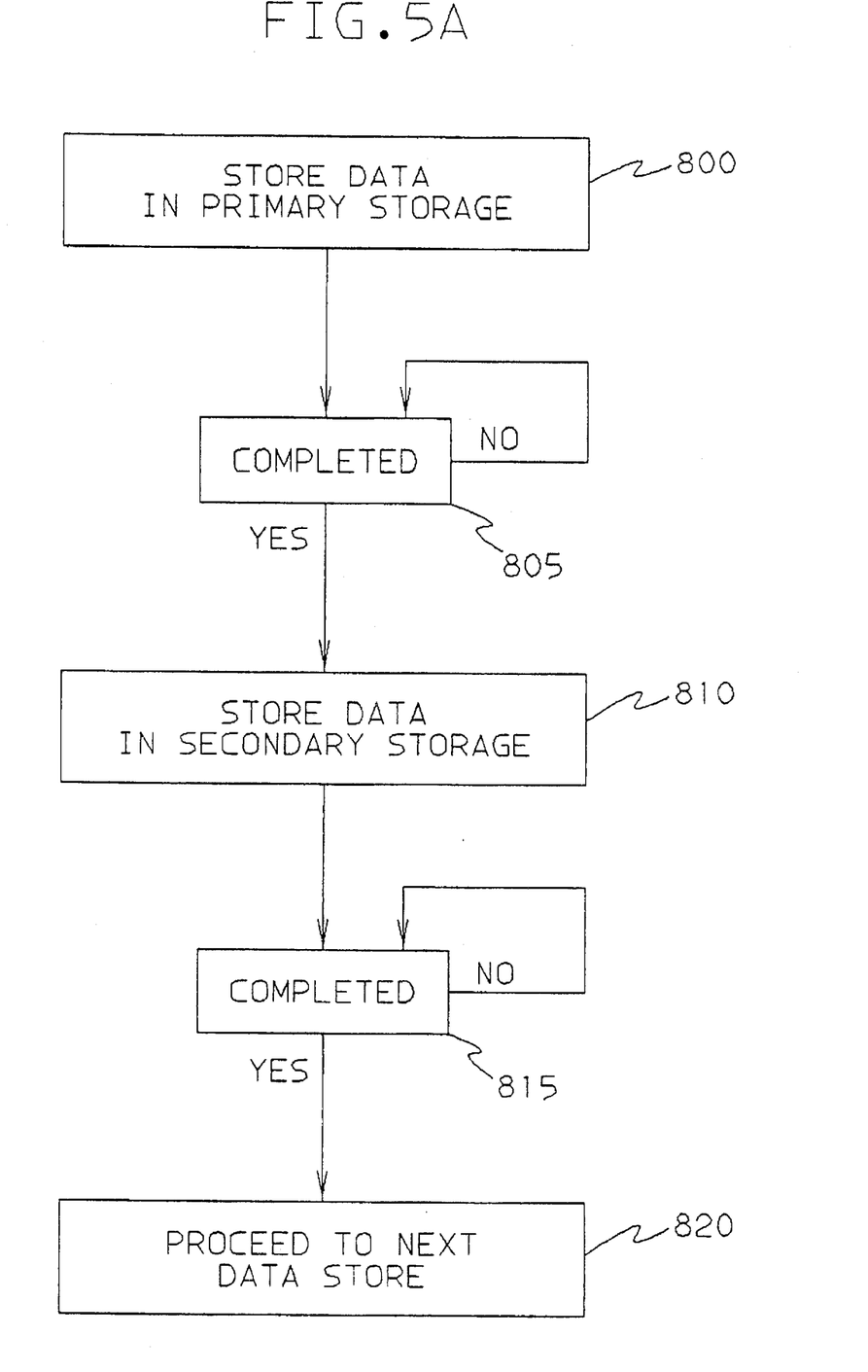
Figure 5B:
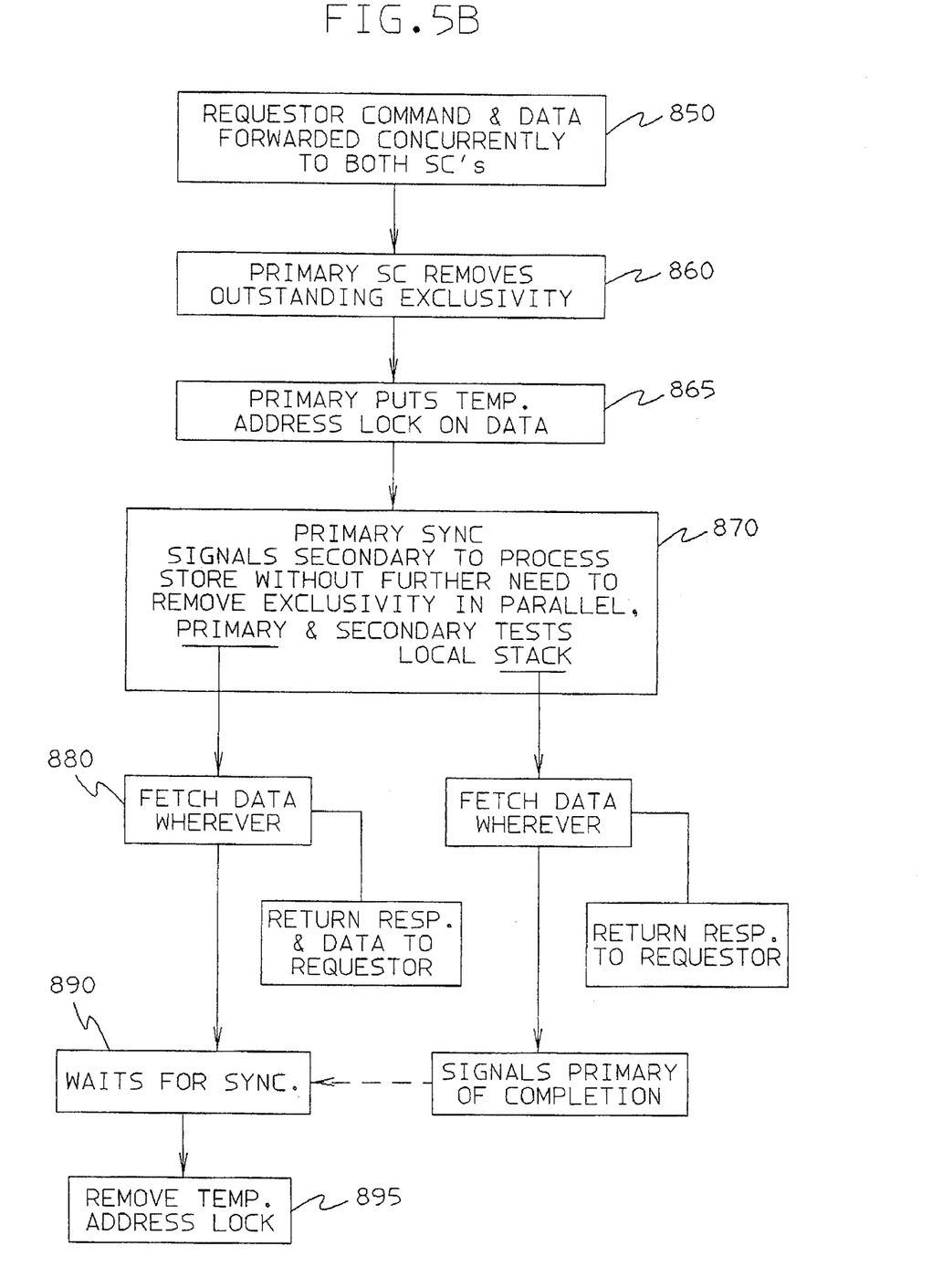

There are some differences in a processor fetch store request and an I/O processor fetch/store request. Typical I/O data store request for data entering from an I/O device brings data directly to storage in blocks of data without a prefetch to alter partial data within a block, as shown in FIG. 5A. The sequence in a dual storage design would be to store to the primary 800, wait for completion 805 and then store to the secondary 810 and wait for completion 815. In the present invention, as shown in FIG. 5B, the I/O requester sends command and data concurrently to both SC's 850. The primary removes outstanding exclusivity 860, puts a temporary lock on the data 865, sends synchronization signal to secondary to process store without further need to remove exclusivity 870. In parallel, primary and secondary test local stack 880. Both memory controller's store data, return responses to requester 890. Primary memory controller waits for synchronization from secondary and removes temporary address lock 895. These lock registers allow concurrency of multiple I/O stores while providing serialization of stores. These locks also maintain data integrity for recovery purposes in case one side fails. During recovery of rewriting the data, only requester with valid requester ID and address ID are permitted to retry. Secondary to primary synchronization mechanism allows for recovery in either primary or secondary. An error response or lack of response as seen by the requestor will cause the requestor to initiate a recovery action. If primary memory controller data cannot be retrieved through normal and retry techniques, the secondary memory controller is made a primary memory controller for that data segment and it becomes the data source.

This invention is applicable to an extended storage (ES) which is not directly attached to the system controller. Implementation can have the extended storage as a separate entity, larger in size and slower response rate than central storage. Data is usually transferred in large blocks such as 4K byte pages. Data is transferred from main storage to extended storage for page out commands and from extended storage to main storage for page in commands.

Figure 6:
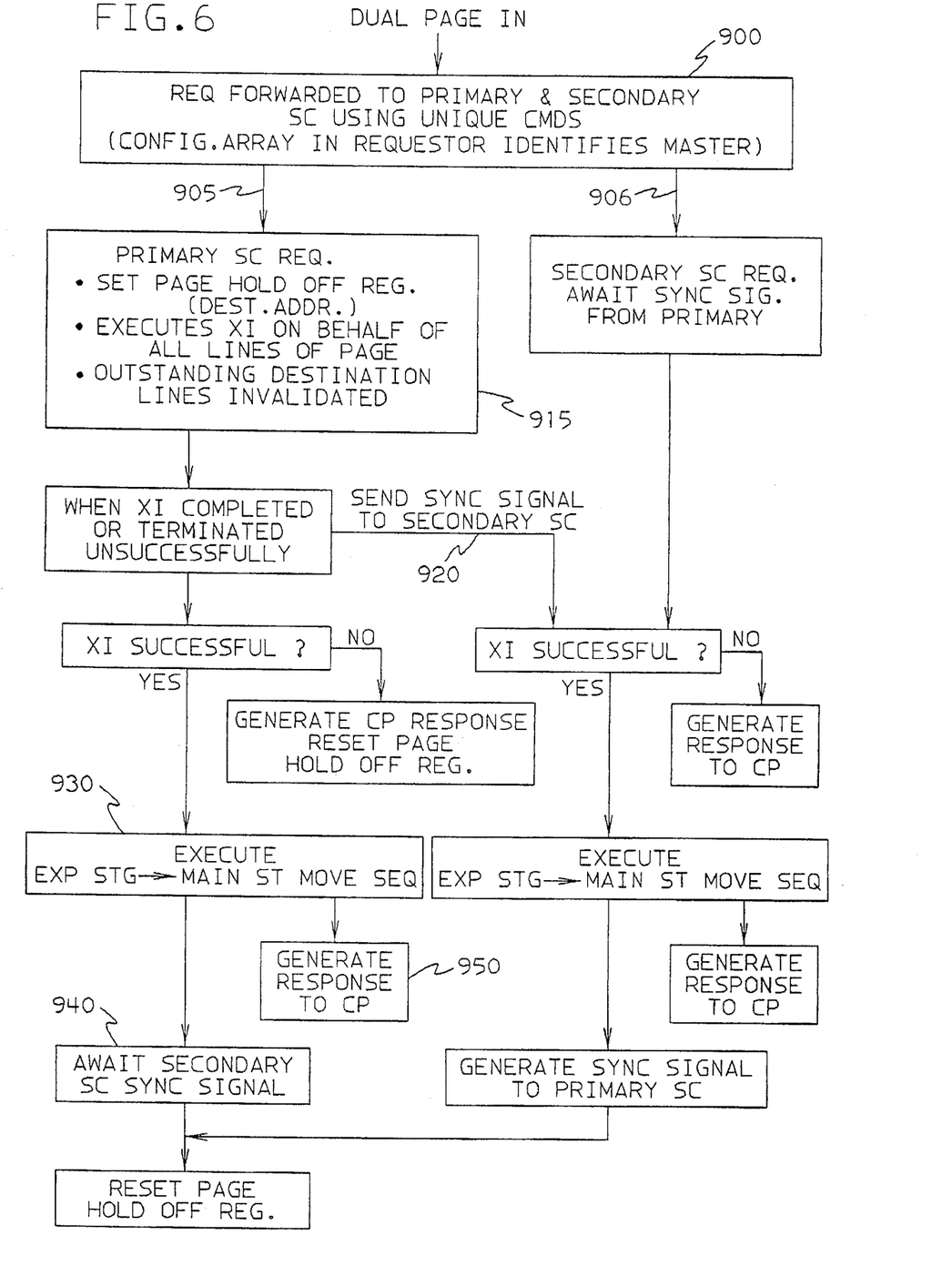
FIG. 6 is a schematic diagram showing the steps of a dual page-in, according to one embodiment of the present invention.

On page in requests, shown in FIG. 6, requesters issue separate commands, simultaneously to both the primary 905 and secondary 906 memory controller to which the extended stores are attached. A command identifier identifies which memory controller is the primary. A page holdoff register 910 in the primary memory controller maintains integrity of the page in main storage until data is in the storage of both memory controller's. Primary memory controller executes cross interrogation on behalf of all lines in the page of data 915. Primary memory controller sends synchronizing signal to secondary memory controller 920, both memory controllers concurrently send data from expanded to main storage. Primary memory controller awaits synchronizing signal from secondary memory controller before resetting the page holdoff register 940. Both memory controller's give response to the requesting CP 950.

Figure 7:
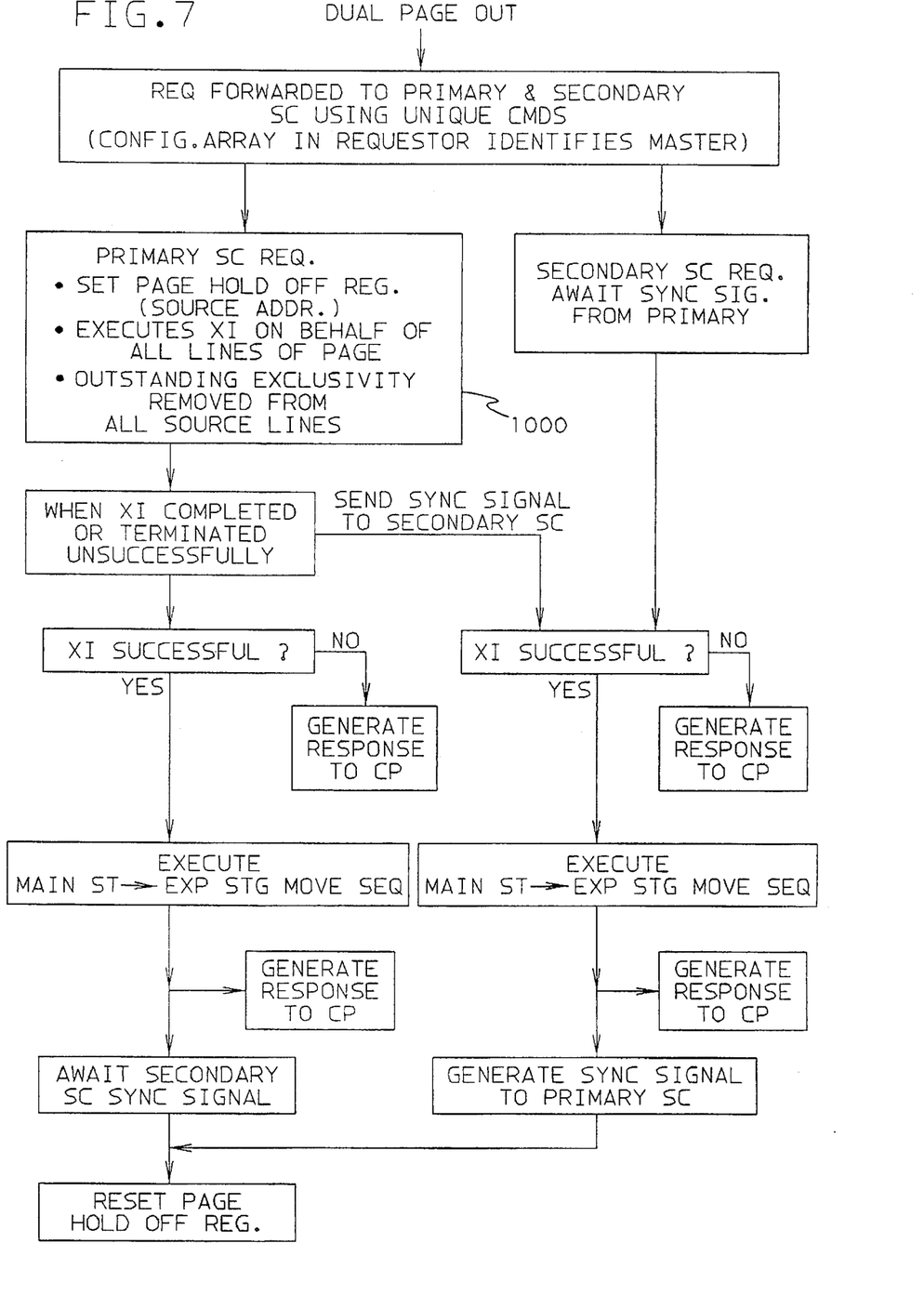
FIG. 7 is a schematic diagram showing the steps of a dual page-out, according to one embodiment of the present invention.

Page out command sending data from main storage to expanded storage is very similar to the page in command, and is shown in FIG. 7. However, in this situation, primary SC must remove all outstanding exclusivity from all main storage source lines before sending synchronizing command to secondary memory controller 1000.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

Having thus described our invention, what we claim as new and desire to secure by Letters Patent is:

1. In a multiprocessor system with at least one memory unit, having at least two memory controllers and a plurality of input-output (I/O) processors, each of I/O processors being defined as a requestor, a method of concurrently allowing parallel fetch and store commands, comprising the steps of:

performing an initialization step during which separate portions in said memory unit are set aside, each portion being designated to each of said memory controllers for its use;

storing physical addresses of each said memory portion in a logic array in said memory unit so that said memory portions can be accessed at any time;

protecting data stored in each of said memory portions by an interlocking data protection mechanism so that only one of said requestors can access said data previously stored at any one time, said interlocking data protection mechanism providing an exclusivity ownership access status for said unit of data so that it can only be accessed and used only by one requestor at any one time;

selecting one of said memory controllers as a primary controller and said other remaining memory controller as a secondary memory controller, said selection being identified in a configuration array associated with each of said requestors;

said primary memory controller performing cross interrogation services and then synchronizing with said secondary memory controller as to ensure data integrity as well as keeping said same exclusive ownership for their assigned data;

allowing each of said memory controller process a fetch or a store request issued by said requestors concurrently, said memory controllers accessing data stored in their respective designated memory portion;

both of said memory controllers signalling a response to said requestor upon processing completion;

said requestor waiting to receive both a first response message and any data requested from said primary memory and a second response message from said secondary memory controller; and said memory controllers removing said exclusivity ownership status upon said requestor's receipt of said processing completion response.

2. The method of claim 1, wherein the step relating to said interlocking data protection mechanism further comprises providing exclusivity data having an exclusivity bit;

maintaining said exclusivity data by said memory controllers to reflect any said exclusive ownership access held by one of said requestors; and determining existence of said exclusive ownership access by allowing said primary memory controller to execute all cross interrogations.

3. The method of claim 2 wherein said step relating to said interlocking data protection mechanism further comprises the steps of contacting any previous requestor owner still having exclusive ownership in order to remove said exclusivity ownership;

said previous owner acknowledging said ownership removal request after receiving status requests from both said memory controllers about its original exclusivity request;

said memory controllers removing said exclusive ownership access by altering said exclusively bit and data when an exclusive fetch command is requested; and said memory controllers removing previous ownership by altering said exclusively bit and data after all copies of any new data are stored when multiple copies are to be stored, but before any other requestor can have access to said central data containing said new data.

4. The method of claim 3, wherein said requestor is a central processor and each of said memory controllers process said store request command from a store stack before signalling said response upon store processing completion;

each of said memory controllers signalling receipt of said store data to a central processor which in turn will notify said requestor;

making said receipt visible during cross interrogation process; and said central processor removing any exclusivity ownership status after receiving primary service controller's request for removing any exclusivity ownership and after receiving notification of a previously stored acknowledgment from both said system controllers.

5. The method of claim 1 wherein said requestor is an I/O processor and said step relating to said interlocking data protection mechanism further comprises the steps of said primary memory controller removing said exclusivity bit and altering said exclusivity data by putting a temporary lock on all data;

said primary controller identifying said I/O processor(s) and then sending a synchronization signal to said secondary memory controller for processing; and said primary and secondary memory controllers accessing and storing said data in parallel, and each returning responses to said requester while said primary memory controller waits for synchronization from said secondary system controller before removing said temporary address lock.

6. The method of claim 1 wherein said step relating to said interlocking data protection mechanism further comprises the steps of: ensuring that exclusive ownership status is appropriately indicated by using a lock mechanism, said lock mechanism comprising a plurality of registers to allow concurrency of multiple I/O stores;

said lock mechanism allowing recovery of data should one of said memory controllers experience hardware failure and loss of data, by accessing said other memory controllers data and transferring said other memory controller's data to said memory portion assigned to said failed memory controller;

said lock mechanism assigning each requestor a requester ID and an address ID so that when said other memory controller sustains a failure only those of said requestors with a valid requestor and address ID are permitted to retry.

7. A device for concurrently allowing parallel fetch and store commands in a multiprocessor system having at least two central processors (CPs) which can be partitioned to provide a plurality of system sides for said multiprocessor system, said device comprising:

at least two memory controllers (SCs);

at least two memory units;

a plurality of input-output (I/O) processors, each of said CPs and I/O processors being defined as a requestor;

communication lines for providing said requestors access to both of said memory controllers; said communication lines allowing interchanging access to said memory controllers selectively in order to prevent continuous engagement of one of said memory controllers at all times;

a configuration array associated with each of said requestors for designating one of said memory controllers as a primary memory controller and said other remaining memory controller as a secondary memory controller;

an interlocking data protection mechanism providing data access to only one of said requestors at any one time, said memory controllers determining an exclusivity ownership access status for said data as held by any one of said requestors and removing said exclusivity ownership access when said requestor discontinues accessing said data;

at least a processing unit for processing a command issued by one of said requestors, said memory controllers signalling a response to said requestor upon processing completion; and said requestor concurrently performing other data updates while waiting for said response from both said memory controllers, said response including both a first response message and any requested data from said primary memory controller, and a second response message from said second memory controller.

* * * * *